United States Patent
Franci et al.

(10) Patent No.: US 12,552,568 B2
(45) Date of Patent: Feb. 17, 2026

(54) TABLET DISPENSING APPARATUS AND METHOD

(71) Applicant: I.M.A. INDUSTRIA MACCHINE AUTOMATICHE S.P.A., Ozzano dell'Emilia (IT)

(72) Inventors: Marco Franci, Ozzano dell'Emilia (IT); Alessandro Masotti, Ozzano Dell'Emilia (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 198 days.

(21) Appl. No.: 18/291,676

(22) PCT Filed: Jul. 21, 2022

(86) PCT No.: PCT/IB2022/056751
§ 371 (c)(1),
(2) Date: Jan. 24, 2024

(87) PCT Pub. No.: WO2023/007327
PCT Pub. Date: Feb. 2, 2023

(65) Prior Publication Data
US 2024/0239539 A1    Jul. 18, 2024

(30) Foreign Application Priority Data
Jul. 26, 2021  (IT) .......... 102021000019868

(51) Int. Cl.
*B65B 37/08* (2006.01)
*B65B 5/10* (2006.01)

(52) U.S. Cl.
CPC .............. *B65B 37/08* (2013.01); *B65B 5/103* (2013.01)

(58) Field of Classification Search
CPC ..................................... B65B 37/08
See application file for complete search history.

(56) References Cited

U.S. PATENT DOCUMENTS

| | | | | |
|---|---|---|---|---|
| 3,083,809 A | * | 4/1963 | Fischer | B65G 37/00 198/481.1 |
| 3,704,815 A | * | 12/1972 | Jones | B65B 37/08 222/368 |

(Continued)

FOREIGN PATENT DOCUMENTS

| | | |
|---|---|---|
| CN | 102100638 | 6/2011 |
| CN | 111315340 | 6/2020 |

(Continued)

OTHER PUBLICATIONS

International Search Report (ISR) issued Nov. 28, 2022 in International (PCT) Application No. PCT/IB2022/056751.

(Continued)

*Primary Examiner* — Gene O Crawford
*Assistant Examiner* — Ayodeji T Ojofeitimi
(74) *Attorney, Agent, or Firm* — Wenderoth, Lind & Ponack, L.L.P.

(57) ABSTRACT

A tablet dispensing apparatus for dispensing tablets into containers includes a cylindrical drum having an inner cavity and a cylindrical side wall provided with a row of seats adjacent to each other along a circumference arc, each seat for accommodating a respective tablet, and an ejection device to interact with the seats at angular ejection positions of the drum to eject the tablets from the seats out of the drum. The side wall is provided internally with a groove extending along the circumference arc and communicating with the seats. The ejection device has an ejection element movable during rotation of the drum, at an angular ejection position thereof, in an operating position. The ejection element is slidably inserted in a groove and at least partially (Continued)

in the seats to push outwardly and eject the respective tablets from the seats while the drum rotates.

15 Claims, 4 Drawing Sheets

(56) References Cited

U.S. PATENT DOCUMENTS

| | | | | |
|---|---|---|---|---|
| 8,068,934 | B2* | 11/2011 | Saltsov | ................ A61J 7/0481 |
| | | | | 221/121 |
| 8,794,273 | B2 | 8/2014 | Ansaloni et al. | |
| 11,376,196 | B2 | 7/2022 | Ribani et al. | |
| 2002/0113076 | A1 | 8/2002 | Collins et al. | |
| 2005/0217207 | A1 | 10/2005 | Konishi et al. | |
| 2009/0218363 | A1* | 9/2009 | Terzini | ................... B65B 5/103 |
| | | | | 221/4 |
| 2010/0115892 | A1* | 5/2010 | Aylward | ................ B65B 35/26 |
| | | | | 53/473 |
| 2011/0146843 | A1 | 6/2011 | Ansaloni et al. | |
| 2013/0186908 | A1* | 7/2013 | Magno | ................ A47J 31/3642 |
| | | | | 221/13 |
| 2015/0239585 | A1* | 8/2015 | Weigel | .................... B65B 5/103 |
| | | | | 222/1 |
| 2016/0081883 | A1* | 3/2016 | Saltsov | ................. A61J 7/0481 |
| | | | | 221/122 |
| 2016/0145031 | A1* | 5/2016 | Reinhold | ........... B65D 83/0409 |
| | | | | 221/22 |
| 2020/0115088 | A1* | 4/2020 | Fahey | ..................... B65B 57/20 |
| 2021/0177700 | A1 | 6/2021 | Ribani et al. | |

FOREIGN PATENT DOCUMENTS

| | | |
|---|---|---|
| EP | 3 257 761 | 12/2017 |
| GB | 1 514 847 | 6/1978 |
| IT | 20164433 | 12/2017 |
| WO | 2005/012100 | 2/2005 |
| WO | 2020/059329 | 3/2020 |

OTHER PUBLICATIONS

Office Action issued Nov. 27, 2025 in corresponding Chinese Application No. 202280052349.2, with English Translation.

* cited by examiner

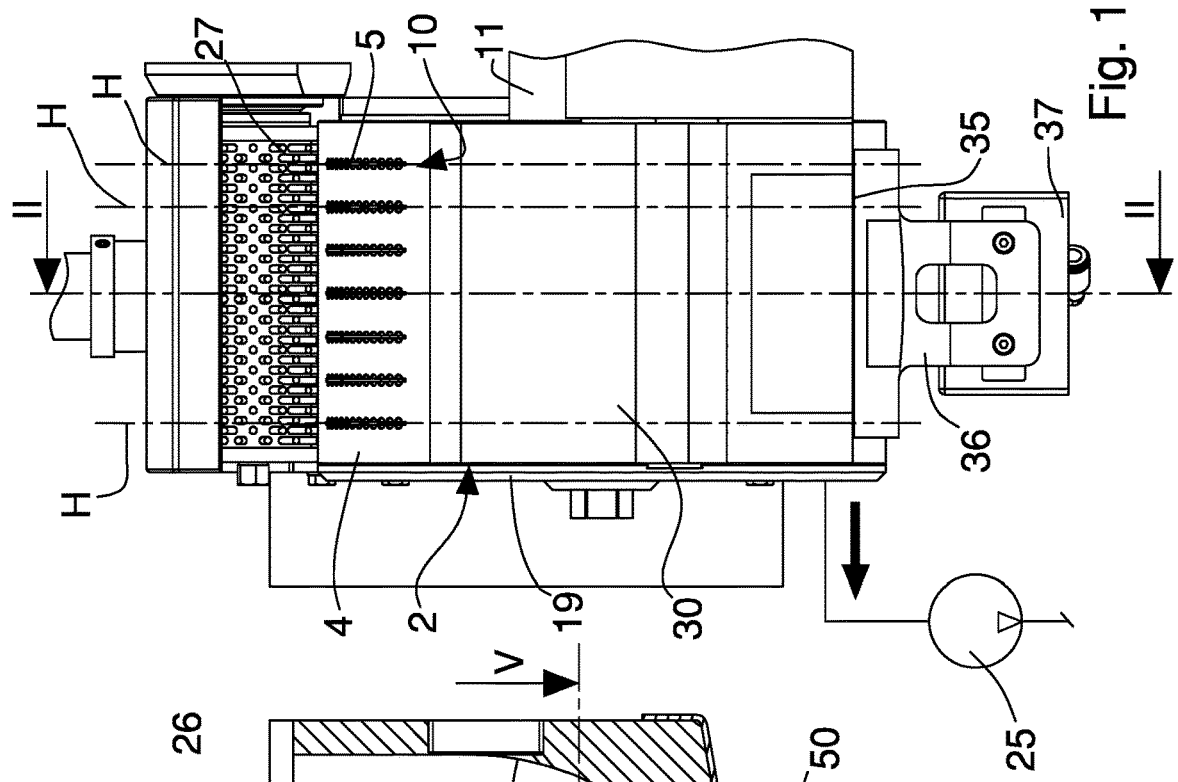
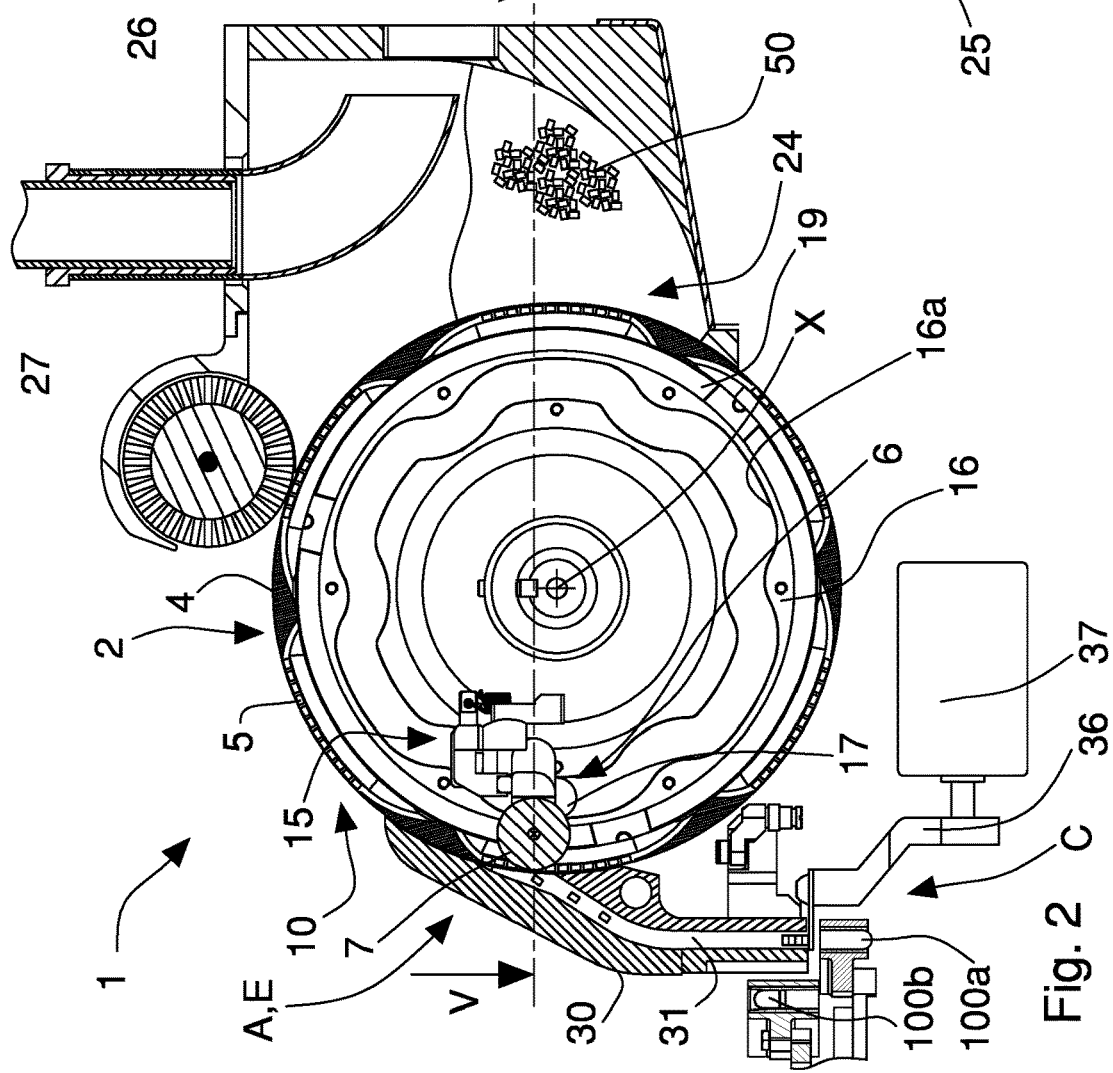

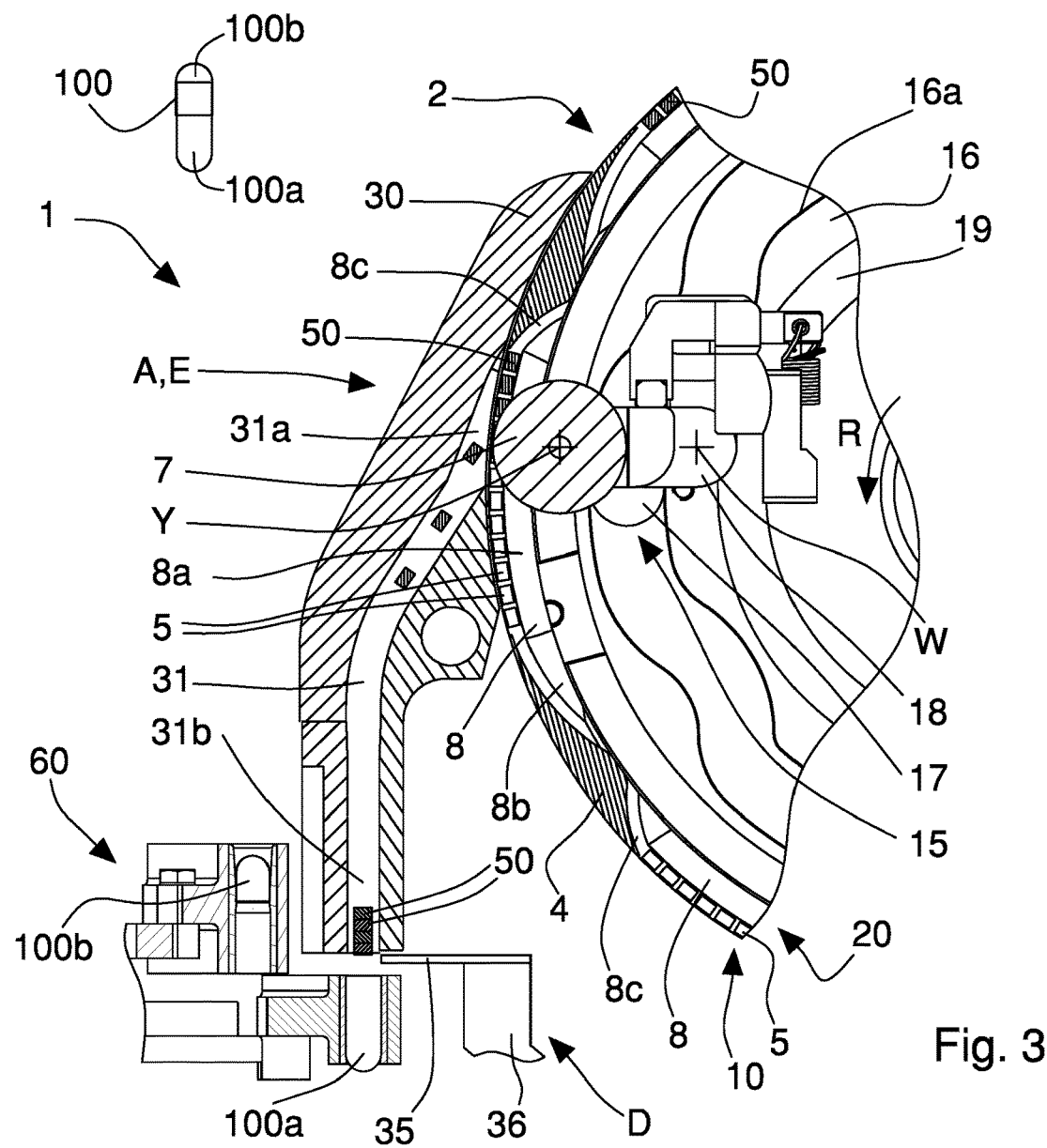
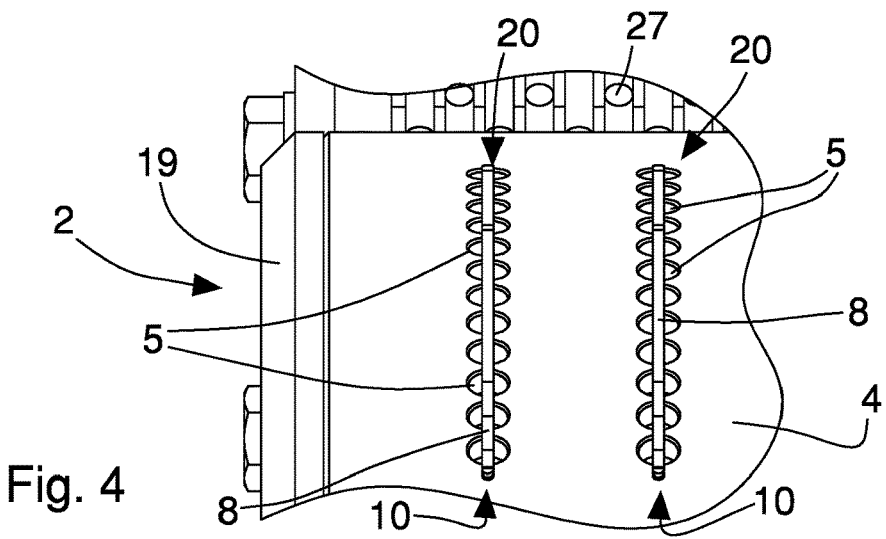
Fig. 3
Fig. 4

Fig. 6
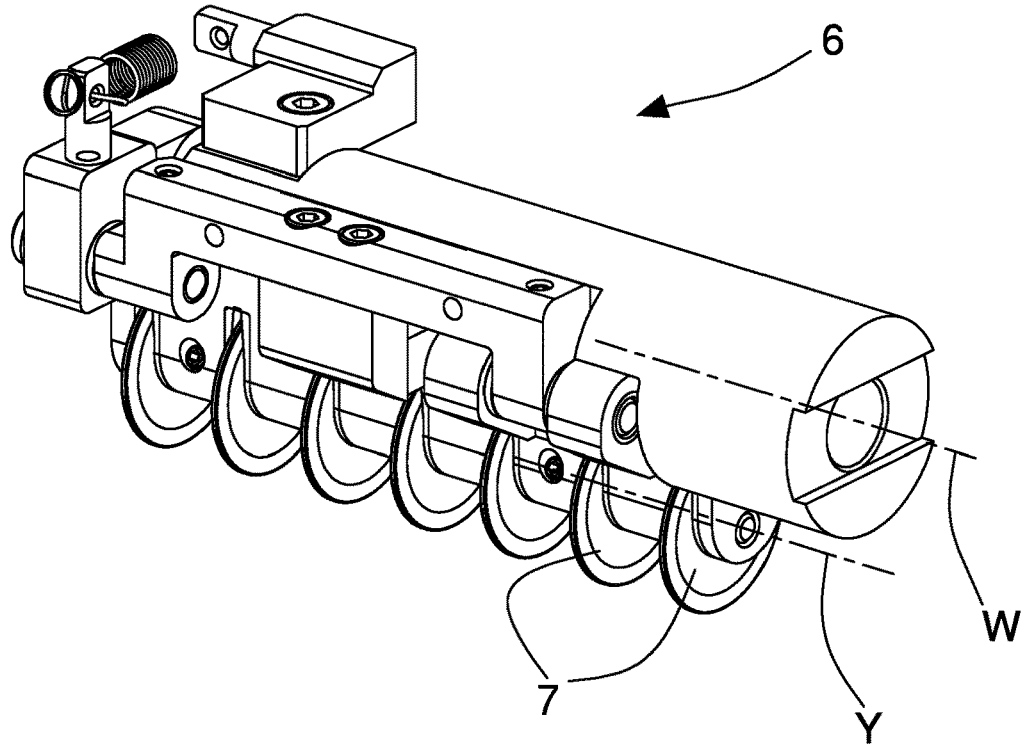
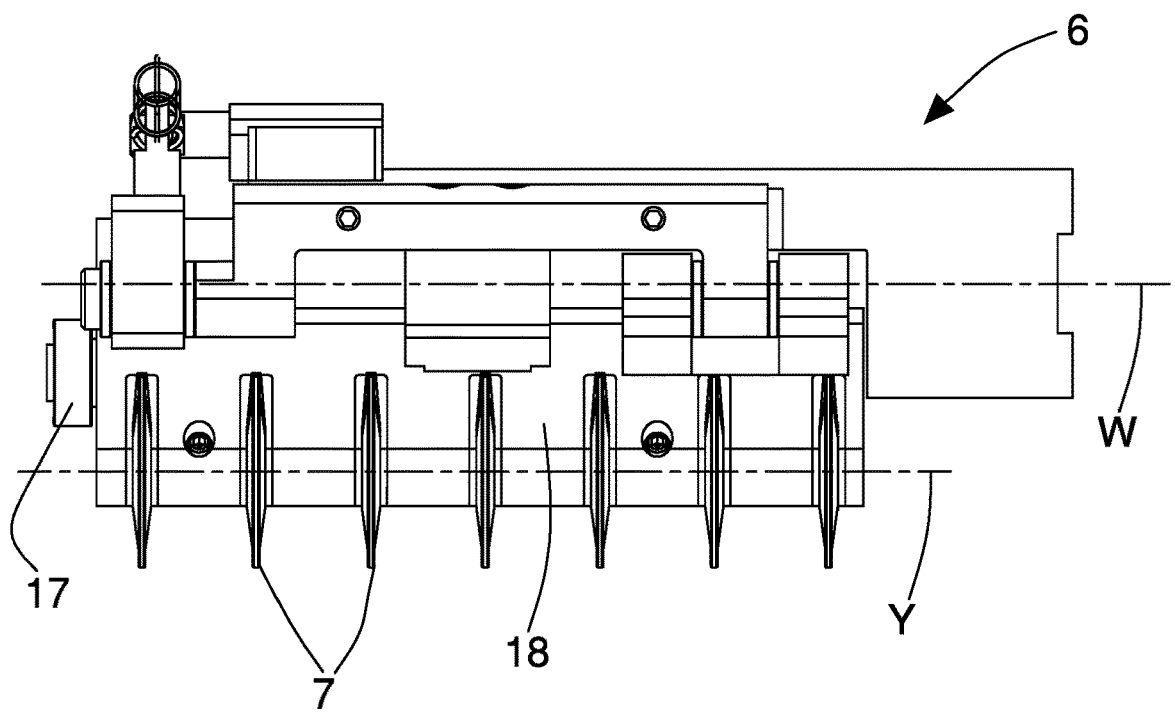
Fig. 7

TABLET DISPENSING APPARATUS AND METHOD

The present invention concerns packaging machines for packaging tablets, lozenges, pills, for example for pharmaceutical, cosmetic, food, chemical use. In particular, the invention relates to a dispensing apparatus for dispensing tablets, lozenges, pills into containers and a method for dispensing tablets.

In the field of packaging tablets, lozenges, pills and the like by means of automatic packaging machines the need to precisely dispense a predefined number of tablets into containers is known. This need is most felt in the pharmaceutical sector where the number of tablets dispensed in a container must coincide exactly with the number shown on the label of the aforesaid container.

In the case of micro-tablets (i.e. tablets typically between 2 and 3 mm in diameter) to be dispensed within hard gelatin capsules for oral use, the dispensing precision should be even higher as the number of micro-tablets determines the amount of the product, typically pharmaceutical, to be administered with the capsule itself. Furthermore, in packaging processes with automatic machines, dispensing even one micro-tablet more or less than the predefined number leads to the capsule being discarded, with consequent loss and waste of pharmaceutical product.

Tablet dispensing apparatuses are known comprising a cylindrical drum rotating about a horizontal axis of rotation and provided on its cylindrical side wall with a plurality of seats suitable for receiving and containing respective tablets, typically micro-tablets. The seats are distributed on the external part of the side wall of the drum circumferentially and parallel to the axis of rotation of the latter.

The drum is partially inserted within a reservoir or hopper containing a plurality of bulk tablets in such a way that by rotating the tablets in contact with the side wall portion of the drum it can be inserted and occupy the seats.

The seats of the tablets are in flow communication with the inside of the drum which is maintained in depression or negative pressure by suitable suction means so as to retain the tablets inside the seats during rotation of the drum.

In a predefined angular position of the drum and inside the latter there are provided pneumatic ejection means capable of delivering pressurized air in the seats so as to eject from the latter the tablets that can be conveyed towards the underlying containers. However, the use of these dispensing apparatuses due to the emission of pressurized air is not always permitted in the pharmaceutical sector, since jets of pressurized air inside the packaging machine can cause possible contaminations, for example of an aseptic or sterile packaging environment.

Apparatuses for dispensing tablets, in particular micro-tablets, are also known which also comprise a cylindrical drum rotating about a horizontal axis of rotation and provided on the outside of the side wall with a plurality of seats suitable for receiving and containing the tablets.

The rotating drum transfers the tablets by gravity to an underlying dispensing wheel that is rotating about a vertical axis of rotation and provided with groups of housings arranged along its peripheral edge and angularly spaced from each other with reference to the vertical axis of rotation. Each group contains a number of housings aligned with each other and equal in number to that of the seats arranged on the outer side wall of the drum along a direction parallel to the horizontal axis of rotation. In this way, each housing of the group receives from the drum a defined number of tablets which is calculated based on the residence time of the group of housings below the drum and/or on the angular displacement of the latter in said time.

After filling the housings, the dispensing wheel moves each group of housings into a dispensing area in which a series of pushers pushes the tablets out of the housings and into the respective containers.

The apparatus described above, while allowing the tablets to be precisely dispensed even at relatively high movement speeds of the packaging machine without using jets of pressurized air, nevertheless has the disadvantage of being cumbersome and complex since it comprises a plurality of components (drum, wheel, pushers) that must be moved in a coordinated manner. The same plurality of components and the relative actuating means must also be replaced to adapt to the production speed of the packaging machine.

Document GB 1514847 describes an apparatus for dispensing tablets or capsules comprising a drum rotating about a horizontal axis and provided in the outer circumferential wall thereof with a plurality of openings arranged in rows extending parallel to said axis, the openings forming seats suitable for containing respective tablets. The apparatus comprises a pair of external cover elements and an internal cover element that are arranged adjacent to the wall of the drum to prevent the tablets from falling from the seats except for a dispensing area where a plurality of chutes suitable for conveying the tablets into the containers are provided. The tablets are ejected from the seats in the dispensing area by means of ejection elements actuated by respective solenoids in the rest phases of the rotating drum which is actuated with intermittent motion.

A disadvantage of this dispensing apparatus lies in its reduced productivity due to the intermittent motion with which the rotating drum is moved.

An object of the present invention is to improve known dispensing apparatuses associable with packaging machines and known methods for dispensing tablets, lozenges, pills and the like within containers.

Another object is to provide a dispensing apparatus and a method for precisely and accurately dispensing a predefined number of tablets into containers even at high production speeds.

A further object is to realize a dispensing apparatus that is particularly compact in size and with low production costs.

Another object still is to provide a dispensing apparatus particularly suitable for use in the pharmaceutical field.

In a first aspect of the invention, a tablet dispensing apparatus according to claim 1 is provided.

In a second aspect of the invention, a method for dispensing tablets according to claim 13 is provided.

The invention can be better understood and implemented with reference to the attached drawings which illustrate an exemplary and non-limiting embodiment thereof, in which:

FIG. 1 is a front view of the tablet dispensing apparatus according to the invention;

FIG. 2 is a section according to line II-II of FIG. 1 in which means for moving containers to be filled are also illustrated;

FIG. 3 is an enlarged detail of FIG. 2 illustrating in particular a tablet ejection device and tablet conveyor means;

FIG. 4 is an enlarged detail of FIG. 1 illustrating in particular rows of tablet seats and respective through grooves;

FIGS. 6 and 7 are respectively perspective and plan views from above of the ejection device.

Figure 5:
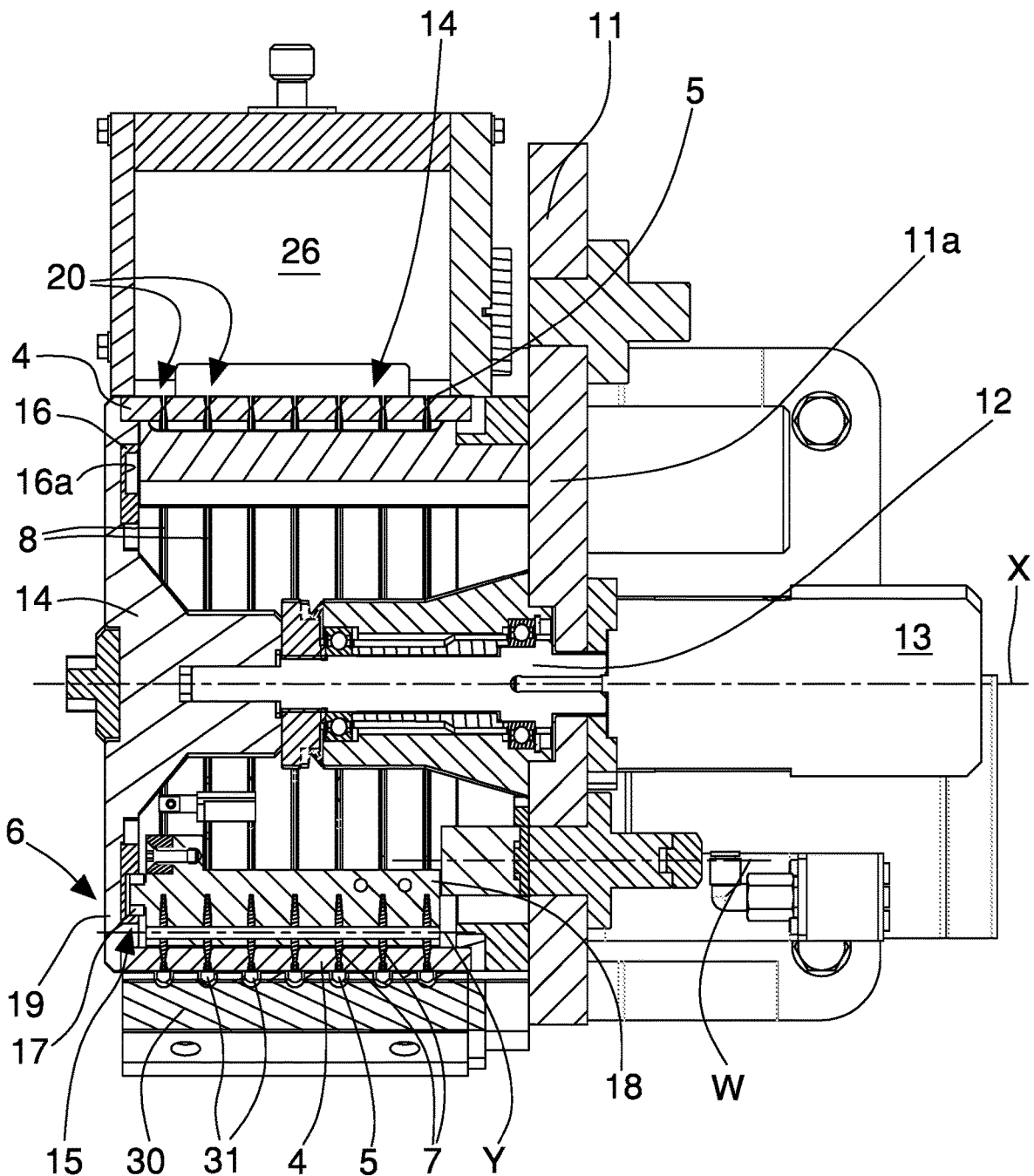
FIG. 5 is a section according to line V-V of FIG. 2.

With reference to FIGS. 1 to 7, a tablet dispensing apparatus 1 suitable for dispensing or dispensing a defined number of tablets 50 into a container 100 is illustrated.

In the embodiment illustrated in the figures, the tablets 50 are micro-tablets, for example with a diameter or transverse dimension between 1.8 and 3 mm, and the containers are capsules 100 formed by a bottom 100a coupled to a lid 100b and made of hard gelatin.

The tablet dispensing apparatus 1 includes a cylindrical drum 2, rotating about an axis of rotation X, for example almost horizontal, and comprising an inner cavity 3 and a side wall 4, in particular cylindrical. The latter is provided, in particular externally i.e. on an external portion or surface thereof, with one or more series 20 of rows 10 of seats 5, each seat 5 being suitable to accommodate a respective tablet 50.

Each row 10 of seats comprises a defined number of seats 5 (e.g. twelve in the example of the figures).

The seats 5 of each row 10 of seats are arranged adjacent to each other along an arc of circumference of a respective guiding circumference H of the drum 2. Each set 20 of rows comprises one or more rows 10 of seats arranged circumferentially and angularly spaced along a respective guiding circumference H of the drum 2.

Guiding circumference H refers to the circumference identified on the cylindrical side wall 4 of the drum 2 from the intersection of the latter with a vertical plane orthogonal to the axis of rotation X.

The dispensing apparatus 1 also comprises an ejection device 6 located in the inner cavity 3 of the drum 2 and configured to interact with the seats 5 at defined angular ejection positions E of the drum 2 so as to eject the tablets 50 from the respective seats 5, outwardly of the drum 2 itself.

The side wall 4 of the drum 2 is provided internally, i.e. on an inner portion or surface, with one or more grooves 8, each of which extends along the respective arc of circumference and communicates with the respective row 10 of seats. In particular, each groove 8 is associated with, and extends along and below, a respective row 10 of seats so as to put the corresponding seats 5 in flow communication with the internal cavity 3. The grooves 8 are passing through, that is they cross the thickness of the side wall 4 and extend in succession (associated with the respective rows 10 of seats) along a corresponding guiding circumference H.

The ejection device 6 comprises at least one ejection element 7 movable during a rotation of the drum 2 and at an angular ejection position E thereof, in an operating position A wherein said ejection element 7 is slidably inserted into the groove(s) 8 and at least partially in the seats 5 of the corresponding row 10 of seats so as to push outwardly and thus eject from the seats 5 themselves the respective tablets 50 while the drum 2 rotates.

The ejection element comprises, for example, an ejection disc 7 rotatably mounted about a respective axis of rotation Y, in particular parallel to the axis of rotation X of the drum 2. The ejection disc 7 is shaped and sized so that it can be inserted into the grooves 8 during rotation of the drum 2 as better explained in the following description.

The ejection device 6 is associated with actuating means 15, located inside the inner cavity 3 of the drum and configured to actuate the ejection element 7 between the operating position A and a non-operating position in which the aforesaid ejection element 7 is spaced from the side wall 4.

The actuating means 15 are, for example, of the cam type and comprise an actuating cam 16, provided with a guide channel 16a and fixed to the drum 2, and a transferring roller 17, engaged in the channel 16a and rotatably fixed to a support element 18 that rotatably supports the ejection element 7.

The support element 18 is rotatably fixed to support means 11, 12 of the dispensing apparatus 1 so as to oscillate or partially rotate about an axis of oscillation W parallel to the axis of rotation X of the drum 2 and thus move the ejection element 7 between the operating position A and the non-operating position along an arcuate trajectory. More precisely, during rotation of the drum 2 the support element 18 is moved by the rotating actuating cam 16 in which channel 16a the transferring roller 17 is engaged.

The support means 11, 12 also rotatably support the drum 2 and the actuating cam 16. More precisely, the support means 11, 12 of the drum 2 comprise a shaft 12 rotatably supported by a support frame 11 of the dispensing apparatus 1 and driven in rotation by a rotary actuator 13, for example an electric motor, about the axis of rotation X with direction of rotation R (counterclockwise with reference to FIGS. 2 and 3). The shaft 12 supports at a free end thereof a hub 14 supporting a front wall 19 of the drum 2; a perimeter edge of the front wall 19 is connected to and supports the side wall 4. The guide cam 16 is mounted on the front wall 19.

In the illustrated embodiment the hub 14 and the front wall 19 are made as a single piece. The drum 2 is closed at the rear, i.e. on the side opposite the front wall 19, by a fixed abutment wall 11a of the support frame 11. The side wall 4, the front wall 19 of the drum 2 and the abutment wall 11a of the support frame 11 define and enclose the internal cavity 3 of the drum 2.

In the embodiment of the dispensing apparatus of the invention illustrated in the figures, the side wall 4 of the drum 2 is provided with a plurality of series 20 of rows 10 of seats 5, for example seven, and each series 20 of rows comprises, arranged one after the other along a respective guiding circumference H, six rows 10 of seats. The rows 10 of seats are thus angularly spaced by an angle of 60° about the axis of rotation X. The rows 10 of seats of the different series 20 of rows are therefore distributed along respective guiding circumferences H parallel to each other and spaced parallel to the axis of rotation X.

The angular ejection positions E of the drum 2 are in number equal that of the rows 10 of seats each series 20 of rows, i.e. six angular ejection positions E in the illustrated embodiment, to allow the ejection device 6 to eject the tablets 50 from the seats 50 of each row 10

Similarly, the ejection device 6 comprises a number of ejection elements 7 equal to the serial number 20 of adjacent rows parallel to the axis of rotation X, i.e. seven ejection elements 7 each of which is configured to be inserted in the operating position A of the ejection device 6 in the grooves 8 of the rows 10 of seats of the corresponding series 20 of rows so as to push outwardly and thus eject the respective tablets 50 from the seats 5.

With particular reference to FIGS. 3 and 4, each groove 8 comprises a central portion 8a, in particular passing through, that is it crosses the thickness of the side wall 4 passes and places the internal cavity 3 in flow connection with the external environment, arranged facing the seats 5 of the corresponding row 10 of seats, an inlet portion 8b having an increasing depth (i.e. extending progressively into the thickness of the side wall 4) arranged upstream of the central portion 8a with reference to the direction of rotation R of the drum 2 and intended to be firstly engaged by the ejection element 7 during rotation of the drum 2, and an outlet portion 8c having a decreasing depth, arranged downstream of the central portion 8a with reference to the direction of rotation R of the drum 2 and intended to be lastly engaged by the ejection element 7 during rotation of the drum 2.

The tablet dispensing apparatus 1 further comprises conveyor means 30 associated externally with the drum 2 and suitable for receiving the tablets 50 ejected from the respective seats 5 by one or more ejection elements 7 and conveying them to one or more underlying containers 100.

To this end, the conveyor means 30 comprise one or more conduits 31 having a respective access opening 31a facing the side wall 4 of the drum and at the angular ejection position E, and an outlet opening 31b facing a corresponding underlying container 100 to be filled, for example the bottom 100a of a capsule 100 subsequently closed by the respective lid 100b. In the illustrated embodiment, the conveyor means 30 comprise six parallel conduits 31, i.e. in number equal to the series 20 of rows.

The tablet dispensing apparatus 1 also comprises closing means 35 associated with the conveyor means 30, in particular at the outlet ends 31b of the conduits 31, and selectively operable between a closed position C (FIG. 2) and an opening position D (FIG. 3). In the closed position C, the closing means 35 engage and close the conduits 31, in particular their outlet ends 31a, in order to retain the tablets 50 within the conveyor means 30, in particular to allow corresponding containers 100, in particular the bottoms 100a of capsules 100, to be positioned below the outlet ends 31b. In the opening position D, the closing means 35 are instead disengaged, in particular spaced apart from the outlet end 31b, and open the conduits 31 to allow the tablets 50 to be released from the outlet ends 31b, in particular within the corresponding containers 100.

The closing means 35 substantially comprise a plate mounted cantilevered on a support 36 and moved linearly between the closed position C and the opening position D by a linear actuator 37.

The containers 100, or more precisely the bottoms 100a of the capsules 100, are positioned below the conveyor means 30 by suitable movement means 60 of a filling/packaging machine, known and not illustrated, on which the tablet dispensing apparatus 1 of the invention is mounted.

With particular reference to FIG. 2, the tablet dispensing apparatus 1 comprises a reservoir or hopper 26 suitable for containing a plurality of bulk tablets 50. The drum 2 is partially inserted within the reservoir 26 in such a way that a portion 24 of the side wall 4 thereof is externally in contact with the tablets 50 allowing them to be inserted into the seats 5.

A rotating cylindrical brush 27 placed on top of the reservoir 26 laps the outer surface of the side wall 4 of the drum 2 at the exit from the reservoir 26 to remove excess tablets 50 inserted into the seats 5 (e.g., two overlapping) and to drop them into the reservoir 26. The rotating cylindrical brush 27 rotates in the same direction of rotation as the drum 2 (counterclockwise with reference to FIG. 2).

The tablet dispensing apparatus 1 further comprises sensor means, of a known type and not illustrated in the figures, capable of detecting seats 5 at the exit from the reservoir 26 that are empty or without tablets 50, so as to discard the container that will be filled with an insufficient number of tablets 50.

The tablet dispensing apparatus 1 is also provided with suction means 25 in flow connection with the inside of the drum 2 and in particular suitable for generating a negative pressure in the internal cavity 3 that cooperates in retaining the tablets 50 within the respective seats 5 during rotation of the drum 2 until the ejection device 6 intervenes.

The operation of the tablet dispensing apparatus 1 of the invention includes the rotation of the drum 2 about the axis of rotation X to allow the ejection device 6 to eject the tablets 50 from the seats 5 present on the outer portion of the cylindrical side wall 4 and at the same time to allow other tablets 50 contained within the reservoir 26 to be inserted into the seats 50. The ejection elements 7 of the ejection device 6 are periodically moved to the operating position A by the actuating means 15 when the drum 2 is in one of the angular ejection positions E in which respective rows 10 of seats are facing the access openings 31 of the conduits 31 of the conveyor means 30. More precisely, during rotation of the drum 2, that is, while the drum 2 rotates with continuous motion, the transferring roller 17 follows the profile of the channel 16a of the guide cam 16, this leading to the rotation of the support element 18 of the ejection device 6 about the axis of oscillation W from the non-operating position to the operating position A and vice versa. The support element 18 supports the ejection elements 7 free to rotate about the respective axis of rotation Y.

In the operating position A, the ejection elements 7 are progressively inserted into the grooves 8 and thus into the seats 5 of the corresponding rows 10 of seats so as to eject the respective tablets 50 from the seats 5 themselves and push them into the conduits 31 of the conveyor means 30 while the drum 2 rotates. The tablets 100 descend by gravity along the conduits 31 as far as the outlet openings 31a. The latter are closed by the closing means 35 arranged in the closed position C and are actuated in the opening position D by the linear actuator 37, to allow the exit of the tablets 50 and the filling of the underlying bottoms 100a of the containers 100, more precisely, the closing means 35 are arranged in the opening position D only when within each conduit 31 of the conveyor means 30 the established number of tablets 50 has accumulated, typically equal to the number of the seats 5 (twelve) of each row 10 of seats, to be dispensed inside the containers 100 and when a corresponding container 100 is correctly positioned below the outlet end 31b of the conduit 31.

Thanks to the tablet dispensing apparatus 1 of the invention, which can be associated with a packaging machine, it is therefore possible to precisely and accurately dispense tablets, lozenges, pills and the like, in particular microtablets, inside containers 100, in particular hard gelatin capsules.

The ejection device 6 provided with a plurality of ejection elements 7 which are inserted while the drum 2 rotates in the grooves 8 made at each row 10 of seats, in fact, allows the tablets 100 to be ejected quickly and precisely and to be pushed through the conveyor means 30 into the containers. The actuating means 15 comprising cam means 16, 17 are in fact able to move the ejection elements 7 in the operating position A precisely and reliably during rotation of the drum 2. It is therefore possible to dispense the tablets 50 by actuating the drum with continuous motion, which guarantees a high productivity to the dispensing apparatus.

Furthermore, since the ejection device 6 and the actuating means 15 are contained inside the drum 2 in the internal cavity 3, the tablet dispensing apparatus 1 of the invention, in addition to being compact in size, is particularly suitable for packaging in the pharmaceutical field. All the components and mechanisms of the ejection device 6 and of the actuating means 15 are in fact separated from the external packaging environment contained in the internal cavity 3 which is also kept in depression by the suction means 25, this preventing possible contaminations of the aforesaid packaging environment.

The method according to the invention for dispensing tablets 50 into containers 100 comprising the following steps:
- arranging a cylindrical drum 2 rotating about an axis of rotation X, said drum 2 comprising an internal cavity 3 and a cylindrical side wall 4 which is provided with at least one row 10 of seats 5 arranged adjacent to each other along an arc of circumference, said side wall 4 of the drum 2 having internally at least one groove 8 extended along said arc of circumference and communicating with said at least one row 10 of seats 5;
- arranging an ejection device 6 inside the internal cavity 3 of the drum 2;
- feeding a plurality of tablets 50 onto a portion of the outer surface of the drum 2 so that each tablet 50 is arranged within a respective seat 5 while the drum 2 is rotated;
- activating the ejection device 6 in a defined angular ejection position E of the drum 2 so as to eject the tablets 50 from the respective seats 5 outwardly of the drum 2;
- wherein the ejection device 6 comprises at least one ejection element 7 actuated in order to be moved to an operating position A wherein the ejection element 7 is slidably inserted into the at least one groove 8 and at least partially into the seats 5 in the ejection angular position E during rotation of the drum 2, so that the tablets 50 are ejected from the respective seats 5 out of the drum 2 while the drum rotates.

The method further provides that the drum 2 is rotated over a circumferential arc such as to allow the ejection of a predetermined amount of tablets 50 within a respective container 100 and to be then stopped and rotated again over a subsequent circumferential arc such as to allow the ejection of a subsequent predetermined amount of tablets 50 within a subsequent respective container 100.

The container 100 is arranged below conveyor means 30 associated externally with the drum 2 in order to convey the tablets 50 ejected from the respective seats 5 to the underlying container 100.

The invention claimed is:

1. A tablet dispensing apparatus for dispensing tablets into containers, the tablet dispensing apparatus comprising:
   - a cylindrical drum rotatable about an axis of rotation and comprising an inner cavity and a cylindrical side wall which is provided with at least a row of seats, each seat being suitable to accommodate a respective tablet, said seats of said at least a row of seats being arranged adjacent to each other along an arc of circumference which develops along a guiding circumference of said drum; and
   - an ejection device located in the inner cavity of said drum and configured to interact with said seats at an angular ejection position of said drum so as to eject the tablets from said seats outwardly of said drum,
   - wherein said side wall of said drum is provided inwardly with at least one groove extending along the arc of circumference and communicating with said at least a row of seats,
   - wherein said ejection device comprises at least an ejection element movable during a rotation of said drum, at the angular ejection position thereof, in an operating position, and
   - wherein said ejection element is slidably inserted in said at least one groove and at least partially in said seats of said at least a row of seats, so as to push outwardly and thus eject from said seats the respective tablets while said drum rotates.

2. The tablet dispensing apparatus according to claim 1, further comprising an actuating system located within the inner cavity and arranged to actuate said at least one ejection element between the operating position and a non-operating position in which said ejection element is spaced from said side wall.

3. The tablet dispensing apparatus according to claim 1, wherein said ejection element comprises a disc rotatably mounted about a respective axis of rotation, parallel to the axis of rotation of said drum, shaped and dimensioned so as to be insertable in said at least one groove.

4. The tablet dispensing apparatus according to claim 2, wherein said actuating system comprises an actuating cam provided with a guide channel fixed to said drum, and a transferring roller engaged in said guide channel and rotatably fixed to a support element which rotatably supports said ejection element.

5. The tablet dispensing apparatus according to claim 1, wherein said at least one groove comprises a central portion arranged facing said seats of said at least a row of seats, an inlet portion having increasing depth, arranged upstream of the central portion with reference to a direction of rotation of said drum and configured to be firstly engaged by said ejection element during rotation of said drum, and an outlet portion having decreasing depth, arranged downstream of the central portion with reference to the direction of rotation of said drum and configured to be lastly engaged by said ejection element during rotation of said drum.

6. The tablet dispensing apparatus according to claim 1, wherein said side wall is provided with a plurality of sets of rows of seats, said rows of seats of each set being circumferentially arranged and angularly spaced along a respective guiding circumference of said drum and spaced from said rows of seats of adjacent sets of rows parallel to the axis of rotation.

7. The tablet dispensing apparatus according to claim 6, wherein said ejection device comprises a number of ejection elements equal to the number of said sets of rows of seats adjacent in a parallel way to the axis of rotation, each ejection element being capable of inserting at the operating position into said grooves of one of said rows of seats of said corresponding set of rows so as to push outwardly and thereby eject the respective tablets from said seats.

8. The tablet dispensing apparatus according to claim 1, further comprising a reservoir suitable for containing a plurality of bulk tablets, said drum being partially rotatably inserted within said reservoir in such a way that a portion at a time of said side wall is externally in contact with the tablets allowing them to be inserted into said seats.

9. The tablet dispensing apparatus according to claim 1, further comprising a suction device for generating a negative pressure in the internal cavity at least in a zone upstream of the angular ejection position, so as to retain the tablets within said respective seats during rotation of said drum.

10. The tablet dispensing apparatus according to claim 1, further comprising a conveyor system externally associated with said drum and configured to receive the tablets ejected from said respective seats by said ejection element and convey the tablets to an underlying container.

11. The tablet dispensing apparatus according to claim 10, wherein said conveyor system comprises at least one conduit having an access opening facing outwardly to said side wall at the angular ejection position, and an exit opening facing the underlying container to be filled.

12. The tablet dispensing apparatus according to claim 11, further comprising a closing element associated with said conveyor system operable between a closed position, in which said conveyor system engages and closes said at least one conduit in order to retain the tablets within said conveyor system, and an opening position in which said closing element is disengaged and said at least one conduit is open allowing the tablets to be released from said exit opening.

13. A method for dosing tablets into containers, the method comprising the following steps:

arranging a cylindrical drum rotatable about an axis of rotation, the drum comprising an inner cavity and a cylindrical side wall which is provided with at least a row of seats arranged adjacent to each other along an arc of circumference, the side wall of the drum having internally at least one groove extended along the arc of circumference and communicating with the at least one row of seats;

arranging an ejection device within the inner cavity of the drum;

feeding a plurality of tablets on a portion of the outward surface of the drum so as each tablet is arranged within a respective seat while the drum is put in rotation; and activating the ejection device in a defined angular ejection position of the drum so as to eject the tablets from the respective seats towards the outside of the drum;

wherein the ejection device comprises at least an ejection element actuated to be moved in an operating position in which the ejection element slidably inserts itself in the at least one groove and at least partially in the seats in the angular ejection position during the rotation of the drum, so as the tablets are ejected from the respective seats outside the drum while the drum rotates.

14. The method according to claim 13, wherein the drum is rotated for the arc of circumference so as to allow the ejection of a predefined amount of tablets within a respective container to be then arrested and put again in rotation for a subsequent arc of circumference so as to allow the ejection of a subsequent predefined amount of tablets within a subsequent respective container.

15. The method according to claim 14, wherein the container is arranged below a conveyor system associated outwardly to the drum to convey the tablets ejected from the respective seats to the below container.

\* \* \* \* \*